United States Patent Office 3,833,619
Patented Sept. 3, 1974

3,833,619
PROCESS FOR THE MANUFACTURE OF
DIMETHYLMALEIC ANHYDRIDE
Marcus Baumann and Hans Bosshard, Basel, Switzerland, assignors to Ciba-Geigy Corporation, Ardsley, N.Y.
No Drawing. Filed June 22, 1972, Ser. No. 265,383
Claims priority, application Switzerland, July 13, 1971, 10,264/71
Int. Cl. C07d 5/04
U.S. Cl. 260—346.8                    7 Claims

ABSTRACT OF THE DISCLOSURE

A new improved process for preparing dimethylmaleic anhydride is disclosed which comprises reacting certain heterocyclic primary amides or salts thereof with fumaric acid, maleic acid or a derivative thereof at temperatures above 70° C.

---

The present invention relates to a process for the manufacture of dimethylmaleic anhydride, the dimethylmaleic anhydride manufactured according to this process and the new intermediate products obtain able according to the process of the invention.

Though various methods for the manufacture of dimethyl maleic anhydride are known from the literature, these processes have not attained any commercial importance since they give low yields and/or require the use of starting products which are expensive or accessible with difficulty.

It has now been found that dimethylmaleic anhydride, that is to say the compound of the formula I (I)

can be obtained in a considerably simpler and above all more economical manner, in very good yields, if at a temperature of above 70° C. (a) at least 1 mol of an amidine of the formula IIa (IIa)

wherein X together with the $$-N=\overset{|}{C}-$$

grouping forms the radical of a 5- or 6-membered hetero-ring which is optionally substituted further and which can contain further hetero-atoms, especially —S—, —N— and —O— atoms, is reacted with 2 mols of fumaric acid or maleic acid or (b) at least 1 mol of an amidine salt of the formula IIb $$\left[ \overset{X}{\underset{N}{\bigcap}} C-NH_2 \right]_n^\oplus \cdot H \ Y^{n\ominus}$$

wherein X has the meaning indicated under the formula IIa and Y denotes the anion of an organic or inorganic acid and $n$ denotes an integer from 1 to 3, especially the number 1 or 2, is reacted with 2 mols of maleic anhydride or fumaric or maleic acid or (c) a salt of maletic or fumaric acid with an amidine of the formula IIa is reacted to give a compound of the formula IIIa or IIIb (IIIa)                (IIIb)

wherein what has been stated under the formula IIa or IIb applies to X, Y and $n$, and the compound of the formula IIIa or IIIb is hydrolysed in an acid medium.

Preferably, maleic acid or maleic anhydride are used in the process according to the invention.

The compounds of the formula IIIa and IIIb are new and can be used, for example, as starting products for the manufacture of optical brighteners. They are white crystalline substances which are soluble in dilute acids and bases and/or water.

Imidazolyl, pyrazolyl, triazolyl, thiazolyl, isothiazolyl, oxadiazolyl, thiadiazolyl, oxazolyl, pyridinyl, pyridazinyl, pyrimidinyl, pyrazinyl and triazinyl radicals should be mentioned as examples of radicals of a 5- or 6-membered hetero-ring, which is optionally substituted further and can contain further hereto-atoms, formed by X together with the $$-N=\overset{|}{C}-$$

grouping.

If these radicals are substituted further, they can, for example, contain halogens, such as fluorine, chlorine or bromine, phenyl groups, alkyl or alkoxy groups with 1–4 carbon atoms, amino groups, monoalkylamino or dialkylamino groups with 1–4 carbon atoms in the alkyl radical or hydroxyl groups, or can be fused to further homocyclic or heterocyclic rings. As examples of fused 5-membered or 6-membered hetero-ring systems there may be mentioned: benzimidazole, benzthiazole, benzoxazole, pterine, purine, quinoline, isoquinoline, naphthyridine, phthalazine, cinnoline, quinazoline and quinoxaline.

Preferably, radicals of a 5-membered or a 6-membered hetero-ring represented by X together with the $$-N=\overset{|}{C}-$$

grouping are not substituted further; the pyridinyl-2 radical is very particularly preferred.

The amidines of the formula IIa are known or can be manufactured in a manner which is in itself known. As examples of suitable compounds of the formula IIa there may be mentioned:

2-aminoimidazole,
2-aminobenzimidazole,
3-aminopyrazole,
3-amino-5-methylpyrazole,
3-amino-4-bromo-5-methylpyrazole,
3-amino-1-phenylpyrazole,
3-amino-1,2,4-triazole,
3,5-diamino-1,2,4-triazole,
4-amino-1,2,3-triazole,
2-amino-1,3-thiazole,
3-aminoisothiazole,
2-amino-5-chlorothiazole,
2-amino-4-phenylthiazole,
2-amino-1,3-benzthiazole,
2-amino-6-bromobenzthiazole,
2-amino-4,6-dibromobenzthiazole,
3-amino-4-phenylfurazane,
3-amino-4-methylfurazane,
3-aminoisoxazole, 2-aminooxazole,
2-aminobenzoxazole,
2-aminopyridine,
2-amino-3-methyl-, 4-methyl- or -6-methylpyridine,
2-amino-5-bromopyridine,
2-amino-6-bromopyridine,
2-amino-5-chloropyridine,
2-amino-3,5-dibromopyridine,
2-amino-3,5-dichloropyridine,
2-amino-3-methylaminopyridine,
2,6-diaminopyridine,
2,3-diaminopyridine,
2-aminopyrazine,
2-aminopyrimidine,
6-amino-2-chloropyrimidine,
6-amino-2,4-dimethylpyrimidine,
2-amino-5-bromo-4,6-dimethylpyrimidine,
2-amino-6-chloropyrimidine,
2-amino-4,6-dichloropyrimidine,
6-amino-2,4-dichloropyrimidine,
2-amino-4,6-dimethylpyrimidine,
4,6-diaminopyrimidine,
6-amino-4-methylpyrimidine,
3-aminopyridazine,
2-amino-1,3,5-triazine,
2,4,6-triamino-1,3,5-triazine,
2-amino-4,6-dichloro-1,3,5-triazine,
2-amino-4,6-dimethyl-1,3,5-triazine,
4-amino-6-hydroxy-2-methyl-1,3,5-triazine,
2,4-diamino-6-methyl-1,3,5-triazine,
8-aminopurine,
2-aminopurine,
6-aminopurine (Adenine),
2-amino-6-bromopurine,
2-amino-6-chloropurine,
6-amino-2,8-dichloropurine,
8-amino-2,6-dichloropurine,
6-amino-2-methylpurine,
2,8-diaminopurine,
6,8-diaminopurine,
7-methyl-2,6,8-triaminopurine,
1-aminoisoquinoline,
2-aminoquinoline,
2,4-diaminoquinoline,
2-amino-1,7-naphthyridine,
2-amino-1,5-naphthyridine,
2-amino-6,7-dimethyl-1,8-naphthyridine,
2-aminoquinoxaline,
2,3-diaminoquinoxaline and 4-aminoquinazoline.

Preferably, 2-aminopyridine is used as the amidine of the formula IIa in the process according to the invention.

If amidine salts of the formula IIb are used as starting products in the process according to the invention, $n$ represents an integer from 1 to 3 and Y preferably represents the anion of formic, acetic, hydrochloric, hydrobromic, sulphuric or phosphoric acid. However, it is very particularly preferred that Y is the anion of acetic acid ($n = 1$). These salts can be manufactured in the usual manner by treating the particular amidine of the formula IIa with the appropriate acid. This preparation can take place directly in situ, or the isolated salt can be used for the reaction.

The reaction according to the invention can be carried out in an organic solvent which is inert towards the reactants, such as optionally chlorinated aromatic hydrocarbons, for example benzene, toluene, xylenes, chlorobenzene or dichlorobenzenes, dialkylsulphoxides, for example dimethylsulphoxide, methylcellosolve, hexamethylphosphoric acid triamide (Hexametapol), N,N-dialkylamides of a lower monocarboxylic acid, for example dimethylformamide or dimethylacetamide, or lower dialkyl esters of carbonic acid, for example dimethyl carbonate or diethyl carbonate. Mixtures of such solvents can also be used. If the amidine salt of the general formula IIb is manufactured directly in situ, the acid used, for example acetic acid, can optionally also be used as the solvent. The solvent is appropriately removed before carrying out the hydrolysis, for example by distilling it off.

According to a preferred embodiment, the reaction according to the invention is carried out without addition of a solvent, but especially in anhydrous acetic acid.

If a salt of fumaric or maleic acid with an amidine of the formula IIa is used as the starting product, free fumaric or maleic acid or maleic anhydride can be further added to the reaction mixture.

The reaction temperature can vary within wide limits depending on the nature of the reaction medium; the reaction is advantageously carried out at temperatures of between 110 and 160° C., under pressure if appropriate.

Usually, the amidine of the formula IIa and the fumaric or maleic acid or the amidine salt of the formula IIb and the maleic anhydride are employed in a mutual molar ratio of 1:2 to 3.5:2; however, a molar ratio of 1:2 is preferred.

The hydrolysis of the compounds of the formula IIIa or IIIb in an acid medium is carried out in a manner which is in itself known, preferably in an aqueous-organic or aqueous-inorganic acid, under reflux conditions. If the reaction is carried out under pressure, for example in an autoclave at a pressure of about 6 to 10 atmospheres gauge, it is advisable to add the acid required for the hydrolysis immediate to the reaction mixture at the beginning of the reaction. In this case, it is possible to employ, as the starting product, either maleic anhydride or maleic acid or fumaric acid, or a mixture of these two acids with one another or with the anhydride. Possible organic acids are, for example, formic acid, trichloroacetic acid, trifluoroacetic acid, methanesulphonic acid and p-toluenesulphonic acid and possible inorganic acids are, for example, sulphuric acid, phosphoric acid nitric acid, hydrochloric acid and perchloric acid. Carrying out the hydrolysis in an aqueous-inorganic acid, above all in aqueous sulphuric acid, is very particularly preferred.

The dimethylmaleic anhydride formed after the hydrolysis can be isolated in the usual manner, for example by filtering it off, or by steam distillation.

After conclusion of the hydrolysis, the amidine liberated, or the amidine salt, can be recovered practically quantitatively, for example by extraction from the mother liquor, which has been rendered alkaline, by means of a water-insoluble organic solvent, such as methylene chloride.

Dimethylmaleic anhydride is an industrially valuable product which can be used, for example, as a medicine for the regeneration of the retina in the case of spot formation in the retina, or as a starting product for the manufacture of scents and aromas [see Recueil, 85 (1966), 43–55].

Example 1

A mixture of 47 g. of 2-aminopyridine and 116 g. of maleic acid is heated to 150° C. whilst stirring, until the evolution of $CO_2$, which starts at 120° C., has terminated. Thereafter, 250 ml. of 4N $H_2SO_4$ are added to the reaction mixture and the whole is boiled under reflux for 1 hour. After cooling to approx. 20° C., the practically colourless dimethylmaleic anhydride precipitates in a crystalline form. Yield: 29 g. (50% of ethory); melting point 92–93° C.

If after completion of the evolution of $CO_2$, 250 ml. of water instead of 250 ml. of 4N $H_2SO_4$ are added to the reaction mixture and the whole is cooled to approx. 20° C., the compound of the formula

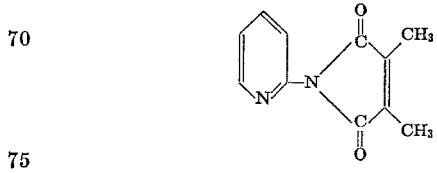

precipitates. After filtration, washing with a little water and drying, 46.4 g. (50% of theory) of crude product of melting point 110–113° C. are obtained; after one recrystallisation from ethanol, the compound of the above formula has a melting point of 112–113° C.

Dimethylmaleic anhydride is obtained in practically the same yield if in the above example, whilst otherwise following the same procedure, the 116 g. of maleic acid used are replaced by the same amount of fumaric acid or 116 g. of a mixture of equal or different parts of fumaric and maleic acid.

2-Aminopyridine is recovered quantitatively from the mother liquor, which has been rendered alkaline with NaOH, by extraction with methylene chloride.

If in Example 1, whilst otherwise following the same procedure, the 47 g. of 2-aminopyridine used are replaced by the equimolar amount of one of the amidines listed in Table I below, column 2, dimethylmaleic anhydride is obtained analogously.

TABLE I

| Example number | Amidine |
|---|---|
| 2 | (pyrazine)-NH$_2$ |
| 3 | (thiazole)-NH$_2$ |
| 4 | H$_3$C-(pyridine)-NH$_2$ |
| 5 | H$_3$C-(pyridine with CH$_3$)-NH$_2$ |
| 6 | (isoxazole)-NH$_2$ |
| 7 | H$_2$N-(triazine)-NH$_2$, NH$_2$ |
| 8 | H$_3$C-(naphthyridine with CH$_3$)-NH$_2$ |
| 9 | Br-(benzothiazole)-NH$_2$ |

Example 10

21 g. of the salt from equimolar amounts of maleic acid and 2-aminopyridine are heated to 150–160° C., whilst stirring, until the evolution of $CO_2$ which starts at 120° C. has ended. Thereafter the reaction product is boiled for 1 hour under reflux with 25 ml. of 4N $H_2SO_4$. After cooling to room temperature (20–25° C.), the dimethylmaleic anhydride formed is filtered off.

Yield: 3.4 g. (54% of theory); melting point 92–92.5° C.

If in the above example, whilst otherwise following the same procedure, the 25 ml. of 4N $H_2SO_4$ used are replaced by the equivalent amount of p-toluenesulphonic acid, phosphoric acid, nitric acid, hydrochloric acid or perchloric acid, dimethylmaleic anhydride is obtained in practically the same yield.

Example 11

A mixture of 21 g. of the salt from equimolar amounts of maleic acid and 2-aminopyridine and 11.6 g. of maleic acid is heated to 160–170° C., whilst stirring, until the evolution of $CO_2$ which starts at 120° C. has ended. Thereafter the reaction product is boiled for 1 hour under reflux with 25 ml. of 4N $H_2SO_4$. After cooling, the dimethylmaleic anhydride formed is filtered off.

Yield: 6.8 g. (56% of theory); melting point 92–92.5° C.

If in the above example, whilst otherwise following the same procedure, the 21 g. of the salt of equimolar amounts of maleic acid and 2-aminopyridine are replaced by the same amount of the corresponding salt from fumaric acid and 2-aminopyridine, dimethylmaleic anhydride is obtained in the same yield.

Example 12

47 g. of 2-aminopyridine and 116 g. of maleic acid are dissolved in 300 ml. of dimethylformamide and the mixture is gently boiled under reflux, whilst stirring, until the evolution of $CO_2$ has ended. Thereafter the dimethylformamide is distilled off in vacuo. 250 ml. of 4N $H_2SO_4$ are then added to the residue and the mixture is boiled under reflux for one hour. Steam distillation of the reaction mixture yields 26 g. (42% of theory) of pure dimethylmaleic anhydride; melting point 92–92.5° C.

Example 13

4.7 g. of 2-aminopyridine are dissolved in 50 ml. of glacial acetic acid, 9.8 g. of maleic anhydride are added and thereafter the mixture is boiled for one hour under reflux until the evolution of $CO_2$ has ended. The glacial acetic acid is then distilled off under normal pressure, in the course of which the reaction mixture must reach a temperature of 150° C. The residue is boiled for 1 hour under reflux with 25 ml. of 4N $H_2SO_4$. After cooling to approx. 20° C., 3.2 g. (50% of theory) of dimethylmaleic anhydride crystallise out; melting point 92–93° C.

Example 14

4.75 g. of 2-aminopyridine are dissolved in 10 ml. of glacial acetic acid, the resulting solution is heated to the boil and a solution of 9.85 g. of maleic anhydride in 15 ml. of glacial acetic acid is then added dropwise over the course of 1½ hours, whilst constantly keeping the reaction mixture under reflux. After continuing to react for a further hour, the reaction mixture is worked up as described in Example 13. 4.50 g. (71% of theory) of dimethylmaleic anhydride of melting point 92–93° C. are obtained.

Example 15

9.6 g. of 2-aminopyridine sulphate (n=2) and 9.8 g. of maleic anhydride are dissolved in 50 ml. of dimethylformamide and the mixture is boiled for 30 minutes under reflux until the evolution of $CO_2$ has ended. The dimethylformamide is then concentrated in vacuo and the residue is boiled with 25 ml. of 4N $H_2SO_4$ under reflux for one hour. After cooling, 1.0 g. (16% of theory) of crystalline dimethylmaleic anhydride are obtained; melting point 92–93° C.

If in the above example, whilst otherwise following the same procedure, the 9.6 g. of 2-aminopyridine sulphate are replaced by the equimolar amount of one of the amidine salts listed in Table II below, column 2, dimethylmaleic anhydride is obtained analogously.

TABLE II

| Example number | Amidine | |
|---|---|---|
| 16 | 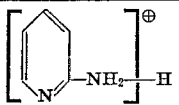 | $Cl^\ominus$ |
| 17 | 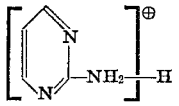 | $CH_3COO^\ominus$ |
| 18 | 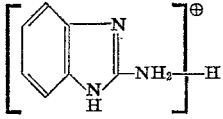 | $Cl^\ominus$ |
| 19 | 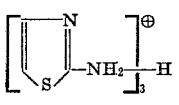 | $(PO_4)^{3\ominus}$ |
| 20 | 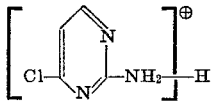 | $Br^\ominus$ |
| 21 | 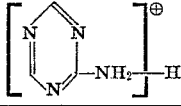 | $HSO_4^\ominus$ |

Example 22

9.6 g. of 2-aminopyridine sulphate ($n=2$) and 9.8 g. of maleic anhydride are conjointly thoroughly pulverised and then warmed to 100–110° C. in an oil bath. At 100° C., a vigorous evolution of gas starts, which is already complete after a few minutes. After the evolution of $CO_2$ has ended, the residue is boiled with 25 ml. of 4N $H_2SO_4$ under reflux for 1 hour. After cooling to room temperature, 1.1 g. (16% of theory) of crystalline dimethylmaleic anhydride are obtained; melting point 92–93° C.

Example 23

70.5 g. of 2-aminopyridine, 147 g. of maleic anhydride and 375 ml. of 4N $H_2SO_4$ are warmed to 160° C. in a 1 litre Tantalum autoclave, and the pressure relief valve is set to 7 atmospheres gauge. The pressure is kept constant for 3 to 4 hours, after which the mixture is cooled to approx. 20° C. and the product which has precipitated is filtered off. 59 g. of a mixture consisting of maleic acid and dimethylmaleic anhydride are obtained. The dimethylmaleic anhydride is separated off by sublimation in vacuo at 100° C.

Yield: 36.9 g. (46% of theory, relative to the unreacted maleic anhydride); melting point 92–93° C.

Example 24

A mixture of 55 g. of 2-amino-3-hydroxypyridine and 116 g. of maleic anhydride is heated to 150° C. whilst stirring until the evolution of $CO_2$ has ended. Thereafter 250 ml. of water are added to the reaction mixture and the whole is cooled to approx. 20° C., whereupon the compound of the formula

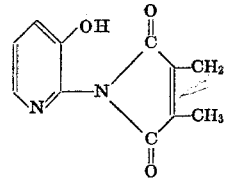

precipitates. After filtering off, washing with a little water and dryingg, 54 g. (50% of theory) of crude product of melting point 196–197° C. are obtained; after one recrystallisation from ethanol, the compound of the above formula has a melting point of 198° C.

If in Example 24, whilst otherwise using the same procedure, the 55 g. of 2-amino-3-hydroxypyridine are replaced by the equivalent amount of one of the amidines listed in Table III below, column 2, the compounds indicated in column 3 of the table are obtained.

TABLE III

| Example number | Amidine of the Formula IIa | Compound of the Formula IIIa | Melting point (° C.) | Yield (percent of theory) |
|---|---|---|---|---|
| 25 | 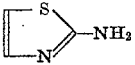 | 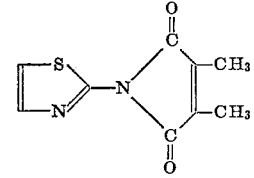 | 111–112 | 30 |
| 26 | 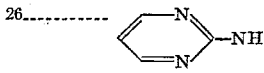 | 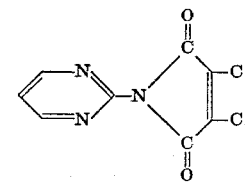 | 134–135 | 10 |
| 27 | 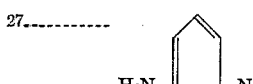 | 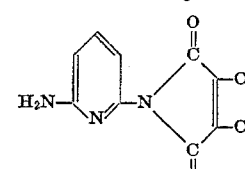 | 207–209 | 32 |
| 28 | 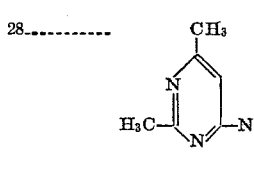 | 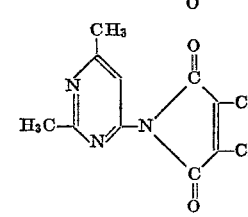 | 110–110.5 | 45 |

What is claimed is:
1. Process for the manufacture of the compound of the formula I

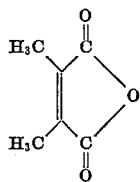

(I)

characterised in that, at a temperature of about 70° C., (a) at least 1 mol of an amidine of the formula IIa

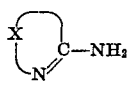

(IIa)

wherein X together with the

grouping forms the radical of a 5- or 6-membered hetero-ring which is optionally substituted further and which can contain further hetero-atoms, especially —S—, —N— and —O— atoms, is reacted with 2 mols of fumaric acid or maleic acid or (b) at least 1 mol of an amidine salt of the formula IIb

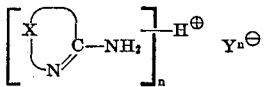

(IIb)

wherein X has the meaning indicated under the formula IIa and Y denotes the anion of an organic or inorganic acid and $n$ denotes an integer from 1 to 3, is reacted with 2 mols of maleic anhydride or fumaric or maleic acid or (c) a salt of maleic or fumaric acid with an amidine of the formula IIa is reacted to give a compound of the formula IIIa or IIIb

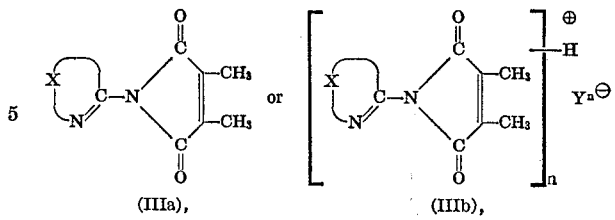

(IIIa), (IIIb), wherein what has been stated under the formula IIa or IIb applies to X, Y and $n$, and the compound of the formula IIIa or IIIb is hydrolysed in an acid medium.

2. Process according to Claim 1, characterised in that an amidine of the formula IIa or an amidine salt of the formula IIb is used, in which X together with the

grouping forms the pyridinyl-2 radical, $n$ represents an integer from 1 to 3 and Y represents an anion of an organic or inorganic acid, especially the anion of acetic acid.

3. Process according to Claim 1, characterised in that maleic acid or maleic anhydride is used.

4. Process according to Claim 1, characterised in that the reaction is carried out at a temperature of 110 to 160° C.

5. Process according to Claim 1, characterised in that the reaction is carried out without addition of a solvent.

6. Process according to Claim 1, characterised in that the reaction is carried out in anhydrous acetic acid.

7. Process according to Claim 1, characterised in that the hydrolysis is carried out in aqueous inorganic acid, preferably in sulphuric acid.

References Cited
UNITED STATES PATENTS
3,017,417  1/1962  Harkes _____ 260—346.8

HENRY R. JILES, Primary Examiner

B. DENTZ, Assistant Examiner

U.S. Cl. X.R.

260—247.2 A, 251 Q, 251 R, 252, 256.4 B, 295 D, 302 F, 302 H, 307 H, 308 A, 308 R, 310 R, 326.36